United States Patent
Griffith et al.

(10) Patent No.: US 7,618,100 B2
(45) Date of Patent: Nov. 17, 2009

(54) BRAKING INTERLOCK FOR AN ELECTRIC BRAKE SYSTEM OF AN AIRCRAFT

(75) Inventors: T. Todd Griffith, Seattle, WA (US); Erik Godo, Redmond, WA (US)

(73) Assignee: The Boeing Company, Chicago, IL (US)

( * ) Notice: Subject to any disclaimer, the term of this patent is extended or adjusted under 35 U.S.C. 154(b) by 435 days.

(21) Appl. No.: 11/610,267

(22) Filed: Dec. 13, 2006

(65) Prior Publication Data

US 2008/0142318 A1    Jun. 19, 2008

(51) Int. Cl.
*G06F 19/00*    (2006.01)

(52) U.S. Cl. .......................... 303/20; 303/15; 303/126; 701/70

(58) Field of Classification Search ......... 188/158–164; 303/3, 7, 15, 20, 126; 701/70
See application file for complete search history.

(56) References Cited

U.S. PATENT DOCUMENTS

| | | | |
|---|---|---|---|
| 5,417,477 A * | 5/1995 | Lasbleis | 303/3 |
| 6,095,293 A | 8/2000 | Brundett et al. | |
| 6,183,051 B1 * | 2/2001 | Hill et al. | 303/126 |
| 6,702,069 B2 | 3/2004 | Ralea et al. | |
| 6,820,946 B2 * | 11/2004 | Salamat et al. | 303/122.09 |
| 7,128,376 B2 * | 10/2006 | Williams et al. | 303/15 |
| 2001/0045771 A1 * | 11/2001 | Corio et al. | 303/20 |
| 2005/0173980 A1 * | 8/2005 | Bohm et al. | 303/155 |
| 2005/0189814 A1 * | 9/2005 | Mallevais et al. | 303/3 |
| 2005/0192733 A1 * | 9/2005 | Dellac et al. | 701/70 |
| 2006/0108864 A1 * | 5/2006 | Evans et al. | 303/126 |
| 2007/0284939 A1 * | 12/2007 | Charles et al. | 303/152 |
| 2008/0030069 A1 * | 2/2008 | Griffith et al. | 303/20 |
| 2008/0149436 A1 * | 6/2008 | Griffith et al. | 188/110 |
| 2008/0150353 A1 * | 6/2008 | Griffith et al. | 303/126 |
| 2008/0154470 A1 * | 6/2008 | Goranson et al. | 701/70 |
| 2008/0258547 A1 * | 10/2008 | Ralea et al. | 303/122 |
| 2008/0258548 A1 * | 10/2008 | May et al. | 303/139 |

FOREIGN PATENT DOCUMENTS

| | | |
|---|---|---|
| EP | 1 484 244 A1 | 12/2004 |
| EP | 1 681 220 A1 | 7/2006 |
| WO | 2007/087361 | 12/2007 |

* cited by examiner

*Primary Examiner*—Christopher P Schwartz
(74) *Attorney, Agent, or Firm*—Tung & Associates

(57) ABSTRACT

An electric brake system for an aircraft includes a power interlock mechanism that prevents inadvertent (uncommanded) application of brakes. The interlock removes operating power from the brake mechanisms whenever the brake system sensor data does not indicate a legitimate brake application condition. The interlock processing occurs in parallel with the brake command processing such that even if an inadvertent brake command is generated, the brake mechanisms will be unable to act upon the inadvertent brake command.

18 Claims, 4 Drawing Sheets

BRAKING INTERLOCK FOR AN ELECTRIC BRAKE SYSTEM OF AN AIRCRAFT

TECHNICAL FIELD

Embodiments of the present invention relate generally to an electric brake system for an aircraft. More particularly, embodiments of the present invention relate to a brake interlock mechanism for an electric brake system of an aircraft.

BACKGROUND

Many aircraft utilize brake systems having brake mechanisms that are controlled by direct cable or hydraulic control architectures. Modern aircraft are beginning to replace conventional cable actuated and hydraulic actuated aircraft brake systems with electrically actuated and electrically controlled brake systems. Such electric brake systems are colloquially referred to as "brake by wire" systems. An aircraft brake system should be designed with safety features that prevent inadvertent braking (i.e., the application of brakes in the absence of a legitimate braking command from the pilot or an automated aircraft system). Moreover, an aircraft brake system should include sufficient processing redundancy to provide reliable brake control and robustness.

BRIEF SUMMARY

An electric brake system suitable for use with an aircraft includes an interlock arrangement that controls whether or not operating power is provided to the electric brake actuators that govern wheel braking. The interlock arrangement utilizes a hardware-based power control architecture that regulates operating power for brake mechanisms in parallel with a software-based command architecture that generates brake mechanism control signals. In one embodiment, a plurality of such interlock arrangements are employed in an independent manner for a plurality of wheel brakes (or for a plurality of wheel brake groups), thus providing reliability and robustness.

The above and other aspects of embodiments of the invention may be carried out by a control arrangement for an electric brake system of an aircraft. The control arrangement includes a brake actuator power control architecture configured to enable/disable operating power for a brake mechanism of the electric brake system, and a brake actuator command architecture in parallel with the brake actuator power control architecture. The brake actuator command architecture is configured to process brake mechanism control signals for the brake mechanism, the brake actuator power control architecture is capable of preventing actuation of the brake mechanism independently of the brake actuator command architecture, and the brake actuator command architecture is capable of preventing actuation of the brake mechanism independently of the brake actuator power control architecture.

The above and other aspects of embodiments of the invention may be carried out by a method for providing an interlock for an electric brake system of an aircraft. The method involves receiving brake actuation data, processing the brake actuation data, and, if the brake actuation data does not indicate a brake application condition, regulating operating power for a brake mechanism to temporarily disable the brake mechanism. Concurrently with and independent of this power management scheme, the method generates brake mechanism control signals in response to the brake actuation data and controls actuation of the brake mechanism with the brake mechanism control signals.

The above and other aspects of embodiments of the invention may be carried out by an electric brake system for an aircraft. The electric brake system includes a brake mechanism for a wheel of the aircraft and a brake control architecture coupled to the brake mechanism. The brake control architecture includes a brake command control configured to generate brake mechanism control signals for the brake mechanism in response to brake actuation data, and an interlock mechanism configured to regulate operating power for the brake mechanism in response to the brake actuation data, concurrently with operation of the brake command control, and independent of the brake command control.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of embodiments of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with a variety of different aircraft brake systems and aircraft configurations, and that the system described herein is merely one example embodiment of the invention.

For the sake of brevity, conventional techniques and components related to signal processing, aircraft brake systems, brake system controls, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 2:
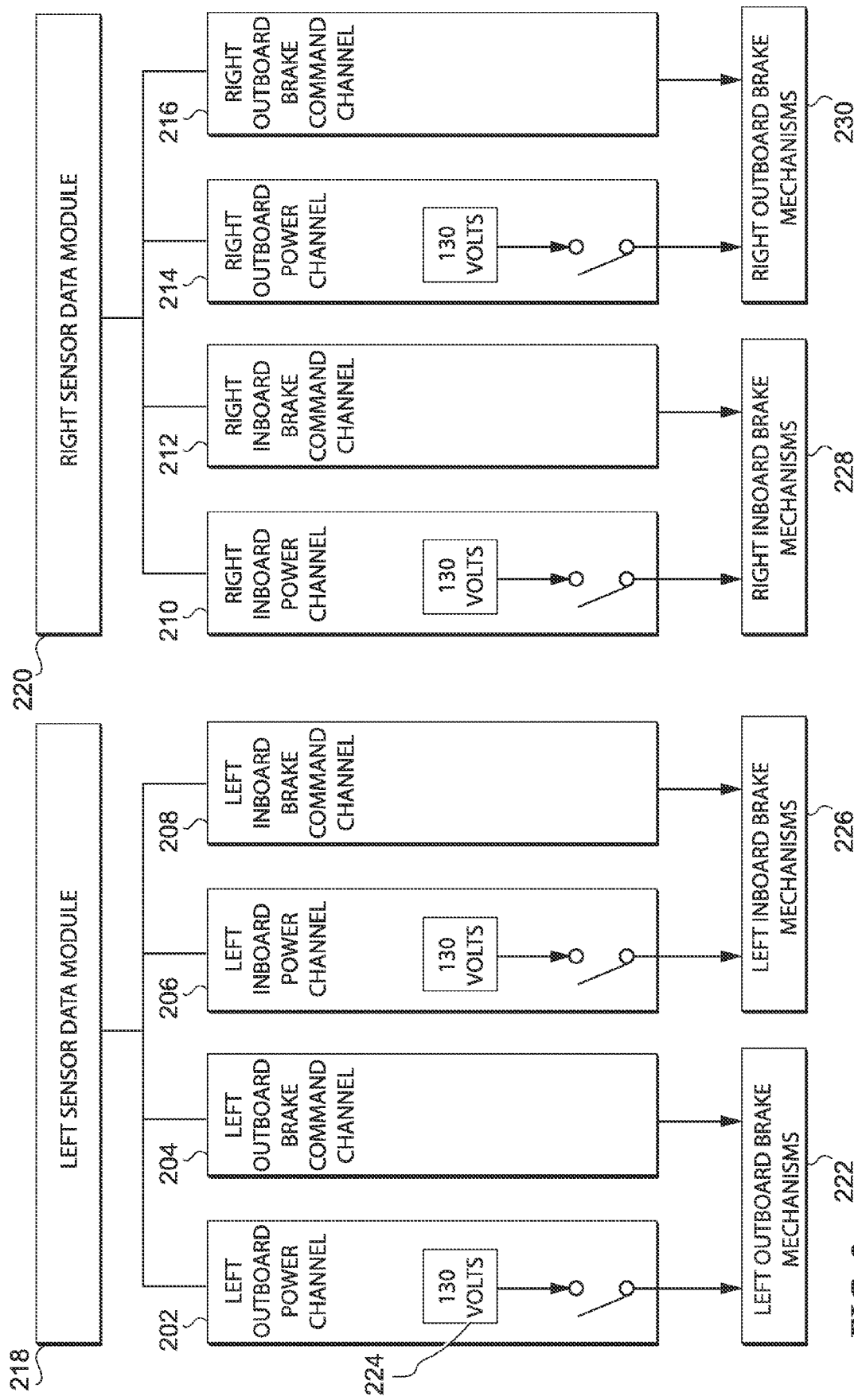
FIG. 2 is a diagram that illustrates independent processing channels of an aircraft electric brake system configured in accordance with an embodiment of the invention.
Figure 3:
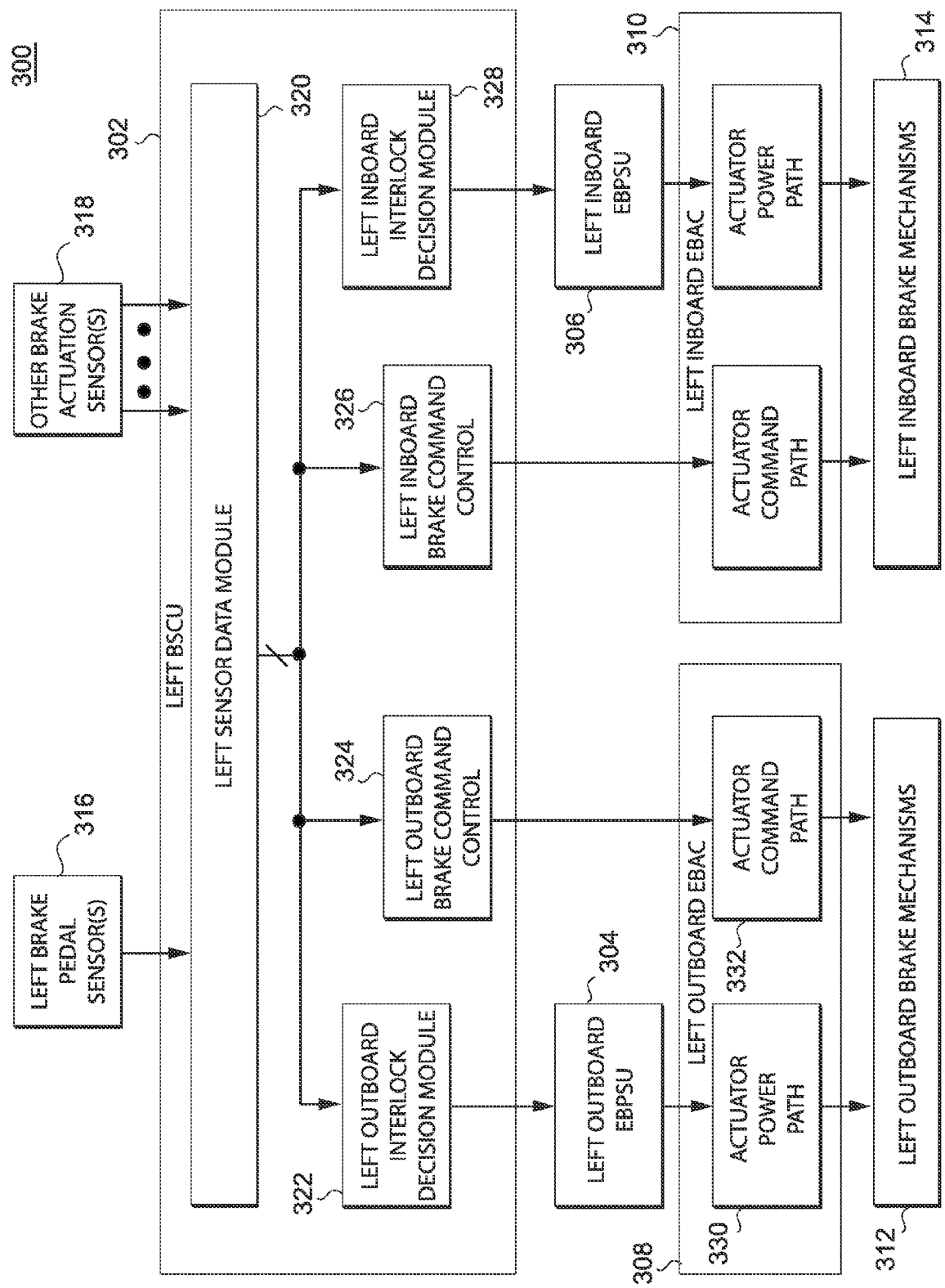
FIG. 3 is a schematic representation of a portion of an aircraft electric brake system configured in accordance with an embodiment of the invention.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-3 depict example arrangements of elements, additional intervening elements, devices, features, or components may be present in an embodiment of the invention.

An aircraft as described herein employs an electric brake system, which may be powered by any suitable power supply, such as an active aircraft power supply that is operational when the aircraft engine(s) are running or a main aircraft battery. The electric brake system includes an interlock feature that is independent of the brake command feature that generates the various brake mechanism control signals. The interlock feature is suitably configured to prevent inadvertent application of the aircraft brakes by removing the actuation power from the electric brake actuators. Thus, even if the actuators are commanded to apply brakes, the lack of actuation power renders them unable to respond to the inadvertent brake commands.

Figure 1:
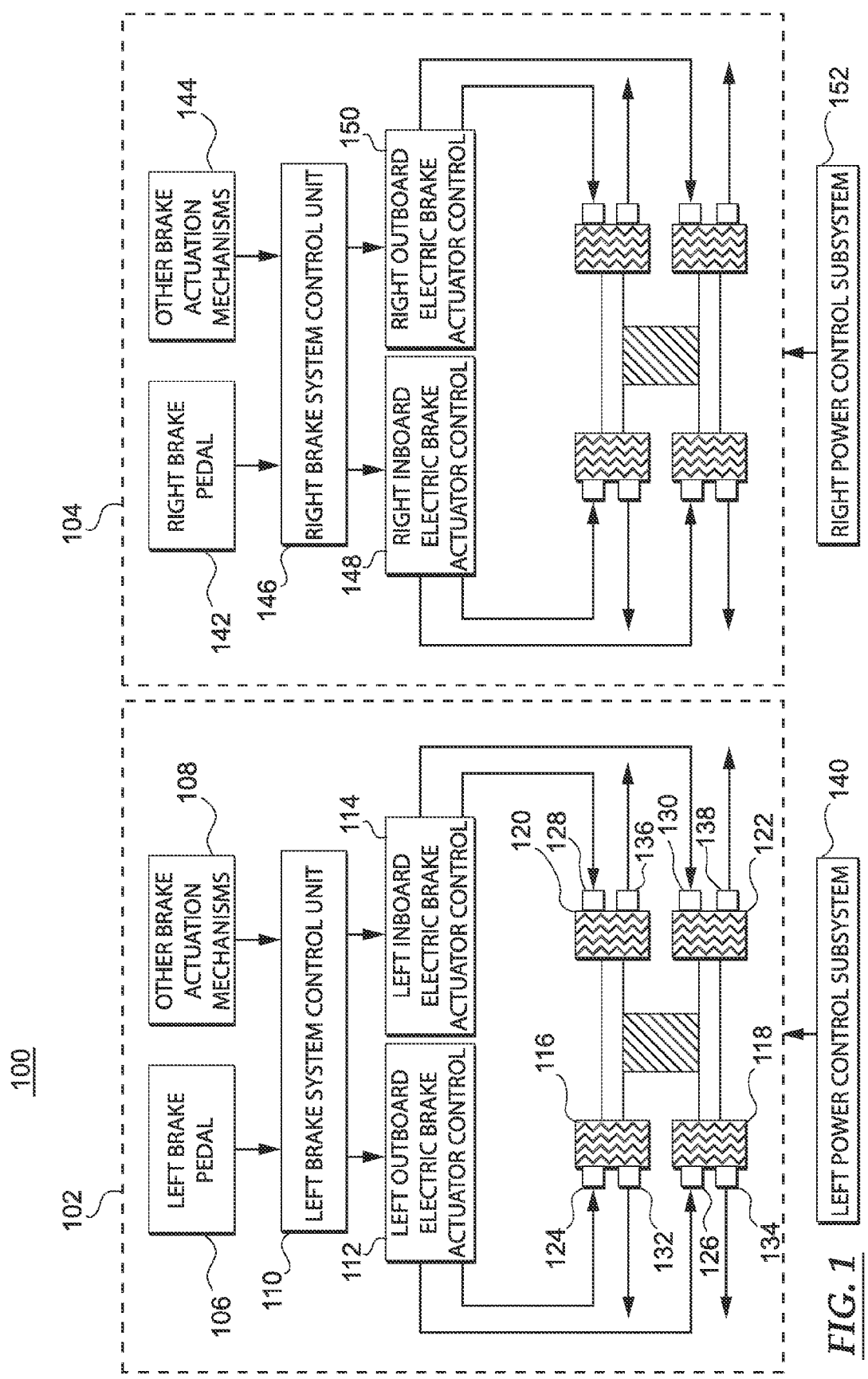
FIG. 1 is a schematic representation of an aircraft electric brake system configured in accordance with an embodiment of the invention.

FIG. 1 is a schematic representation of an example embodiment of an electric brake system 100 for an aircraft. In the example embodiment shown in FIG. 1, the aircraft employs a left electric brake subsystem architecture 102 and a right electric brake subsystem architecture 104, which are similarly configured. The terms "left" and "right" refer to the port and starboard of the aircraft, respectively. In practice, the two subsystem architectures 102/104 may be independently controlled in the manner described below. For simplicity, only left electric brake subsystem architecture 102 is described in detail below. It should be appreciated that the following description also applies to right electric brake subsystem architecture 104.

For this example deployment, left electric brake subsystem architecture 102 generally includes: a brake pedal 106; other brake actuation mechanisms 108; a brake system control unit (BSCU) 110 coupled to brake pedal 106 and to other brake actuation mechanisms 108; an outboard electric brake actuator control (EBAC) 112 coupled to BSCU 110; an inboard EBAC 114 coupled to BSCU 110; an outboard wheel group that includes a fore wheel 116 and an aft wheel 118; an inboard wheel group that includes a fore wheel 120 and an aft wheel 122; electric brake mechanisms (reference numbers 124, 126, 128, and 130) coupled to the EBACs, and remote data concentrators (reference numbers 132, 134, 136, and 138). Each electric brake mechanism includes at least one electric brake actuator that is controlled by the respective EBAC. The electric brake mechanisms and the remote data concentrators correspond to each wheel of left electric brake subsystem architecture 102. Although not shown in FIG. 1, an embodiment may have more than one electric brake mechanism and more than one remote data concentrator per wheel.

Electric brake system 100 can be applied to any number of electric braking configurations for an aircraft, and electric brake system 100 is depicted in a simplified manner for ease of description. An embodiment of electric brake system 100 as deployed may include any number of BSCUs, any number of EBACs coupled to and controlled by each BSCU, and any number of brake mechanisms for each wheel (or for each group of wheels). In operation, electric brake system 100 can independently generate and apply brake actuator control signals for each wheel of the aircraft or concurrently for any group of wheels.

The elements in left electric brake subsystem architecture 102 can be coupled together using a data communication bus or any suitable interconnection arrangement or architecture. For example, a digital data communication bus or buses may be configured to communicate EBAC control signals from BSCU 110 to the EBACs, to communicate brake mechanism control signals (e.g., actuator control signals) from the EBACs to the electric brake actuators, etc. Briefly, BSCU 110 reacts to manipulation of brake pedal 106 and generates control signals that are received by EBACs 112/114. In turn, EBACs 112/114 generate brake mechanism control signals that are received by electric brake mechanisms 124/126/128/130. In turn, the electric brake actuators engage to impede or prevent rotation of the respective wheels. These features and components are described in more detail below.

Brake pedal 106 is configured to provide pilot input to electric brake system 100. The pilot physically manipulates brake pedal 106, resulting in deflection or movement (i.e., some form of physical input) of brake pedal 106. This physical deflection is measured from its natural position by a hardware servo, one or more brake pedal sensors, or any equivalent component, converted into a BSCU pilot command control signal by a transducer or an equivalent component, and sent to BSCU 110. The BSCU pilot command control signal may convey brake pedal sensor data that may include or indicate the deflection position for brake pedal 106, the deflection rate for brake pedal 106, a desired braking condition for brake mechanisms 124/126/128/130, or the like.

Other brake actuation mechanisms 108 may include one or more of the following, without limitation: a thrust lever for the aircraft and any associated sensors and processing logic; a parking brake lever for the aircraft and any associated sensors and processing logic; a landing gear up/down lever for the aircraft and any associated sensors and processing logic; and any other device, component, or subsystem of the aircraft that may have an impact on the operation of the aircraft brake mechanisms. Other brake actuation mechanisms 108 may control the application of brakes even in the absence of pilot manipulation of brake pedal 106. For example, electric brake system 100 (and BSCU 110 in particular) may be configured to prevent the application of brakes if the thrust lever is not at idle. As another example, electric brake system 100 (and BSCU 110 in particular) may be configured to enable the brake mechanisms whenever the parking brake lever is engaged. As yet another example, electric brake system 100 (and BSCU 110 in particular) may be configured to disable the brake mechanisms when the landing gear lever is in an "up" state (i.e., the landing gear of the aircraft are retracted). In practice, a gear retract braking feature may allow electric brake system 100 to apply the brakes while the landing gear is being retracted and/or for a short time after the landing gear has retracted.

An embodiment of electric brake system 100 may use any number of left BSCUs 110. For ease of description, this example includes only one left BSCU 110. BSCU 110 is an electronic control unit that has embedded software that digitally computes EBAC control signals that represent braking commands. The electrical and software implementation allows further optimization and customization of braking performance and feel if needed for the given aircraft deployment.

BSCU 110 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration. In one embodiment, BSCU 110 is implemented with a computer processor (such as a PowerPC 555) that hosts software and provides external interfaces for the software.

BSCU 110 monitors various aircraft inputs to provide control functions such as, without limitation: pedal braking; parking braking; automated braking; and gear retract braking. In addition, BSCU 110 blends antiskid commands (which could be generated internally or externally relative to BSCU 110) to provide enhanced control of braking. BSCU 110 obtains pilot command control signals from brake pedal 106, along with additional command control signals from other brake actuation mechanisms 108. BSCU 110 may also receive wheel data (e.g., wheel speed, rotational direction, tire pressure, etc.) from remote data concentrators 132/134/136/138. BSCU 110 processes its input signals and generates one or more EBAC control signals that are received by EBACs 112/114. In practice, BSCU 110 transmits the EBAC control signals to EBACs 112/114 via a digital data bus. In a generalized architecture (not shown), each BSCU can generate independent output signals for use with any number of EBACs under its control.

BSCU 110 is coupled to EBACs 112/114 in this example. Each EBAC 112/114 may be implemented, performed, or realized in the manner described above for BSCU 110. In one embodiment, each EBAC 112/114 is realized with a computer processor (such as a PowerPC 555) that hosts software, provides external interfaces for the software, and includes suitable processing logic that is configured to carry out the various EBAC operations described herein. Each EBAC 112/114 obtains EBAC control signals from BSCU 110, processes the EBAC control signals, and generates the brake mechanism control signals (brake actuator signals) for its associated electric brake mechanisms.

Notably, the functionality of BSCU 110 and EBACs 112/114 may be combined into a single processor-based feature or component. In this regard, BSCU 110, EBAC 112, EBAC 114, or any combination thereof can be considered to be a brake control architecture for electric brake system 100. Such a brake control architecture includes suitably configured processing logic, functionality, and features that support the brake control operations described herein.

Each wheel may include an associated electric brake mechanism, and each brake mechanism may include one or more electric brake actuators. Consequently, braking and parking braking for each wheel may be independently and individually controlled by electric brake system 100. Each electric brake actuator is suitably configured to receive actuator control signals from its respective EBAC, wherein the actuator control signals influence adjustment of the electric brake actuator. In this embodiment, each electric brake actuator in electric brake system 100 is coupled to and controlled by an EBAC. In this manner, EBACs 112/114 control the electric brake actuators to apply, release, modulate, and otherwise control the application of the wheel brakes. In this regard, EBACs 112/114 generate the brake mechanism control signals in response to the respective EBAC control signals generated by BSCU 110. The brake mechanism control signals are suitably formatted and arranged for compatibility with the particular brake mechanisms utilized by the aircraft. Those skilled in the art are familiar with aircraft brake mechanisms and the general manner in which they are controlled, and such known aspects will not be described in detail here.

The left electric brake subsystem architecture 102 may include or cooperate with a suitably configured power control subsystem 140. Power control subsystem 140 may be coupled to BSCU 110, to EBACs 112/114 (and/or to other components of electric brake system 100). In this embodiment, power control subsystem 140 is suitably configured to provide, apply, remove, switch, or otherwise regulate the operating power for the electric brake mechanisms and/or the electric brake actuators as needed. For example, power control subsystem 140 can remove power from EBACs 112/114 and/or other components of left electric brake subsystem architecture 102 as needed to provide an interlock feature for electric brake system 100. As described in more detail below, power control subsystem 140 may be implemented with a left outboard power supply unit and a left inboard power supply unit that function in an independent manner to regulate operating power for the left outboard and left inboard electric brake components.

Right electric brake subsystem architecture 104 has a structure that is similar to left electric brake subsystem architecture 102 (common features, functions, and elements will not be redundantly described here). For this example deployment, as shown in FIG. 1, right electric brake subsystem architecture 104 includes: a brake pedal 142 that is separate and distinct from brake pedal 106; other brake actuation mechanisms 144; a BSCU 146; an inboard EBAC 148; an outboard EBAC 150; and a power control subsystem 152 that is separate and distinct from power control subsystem 140. In practice, one or more of the other brake actuation mechanisms 144 may be the same as one or more of the other brake actuation mechanisms 108 in left electric brake subsystem architecture 102. Alternatively, the two sides of electric brake system 100 may utilize separate and distinct components for the other brake actuation mechanisms 108/144. These various components of right electric brake subsystem architecture 104 are coupled together to operate as described above for left electric brake subsystem architecture 102, however, the right-side processing is preferably independent of the left-side processing.

In accordance with one embodiment of an electric brake system for an aircraft, a power interlock feature is provided to prevent inadvertent application of the wheel brakes (and to prevent inadvertent release of the wheel brakes). A control arrangement or architecture in the electric brake system can be designed to implement such an interlock feature. For example, electric brake system 100 may be configured to support a power interlock feature.

FIG. 2 is a diagram that illustrates independent processing channels of an aircraft electric brake system configured in accordance with an embodiment of the invention. In particular, FIG. 2 depicts a left outboard power control channel 202, a left outboard brake command channel 204, a left inboard power control channel 206, a left inboard brake command channel 208, a right inboard power control channel 210, a right inboard brake command channel 212, a right outboard power control channel 214, and a right outboard brake command channel 216. These processing channels may be realized in the components of electric brake system 100, e.g., the BSCUs, the EBACs, the power control subsystems, etc. In practice, each processing channel may include, without limitation: hardware components; digital logic elements; processing logic; circuit components; or any suitably configured architecture, arrangement, or feature. Moreover, each processing channel is suitably configured to perform the operations described herein.

For this example, the left processing channels correspond to left-side processing of the electric brake system and the right processing channels correspond to right-side processing of the electric brake system. In this regard, the left processing channels may be fed by a left sensor data module 218, which is configured to provide brake actuation data to the left processing channels. In an embodiment of an electric brake system, left sensor data module 218 provides the same brake actuation data to each of the left processing channels. Similarly, the right processing channels may be fed by a right sensor data module 220, which is configured to provide brake actuation data to the right processing channels. In an embodiment of an electric brake system, right sensor data module 220 provides the same brake actuation data to each of the right processing channels. Moreover, left sensor data module 218 and right sensor data module 220 may receive, process, and/or provide common brake actuation data. For example, if the aircraft includes only one parking brake lever, then the parking brake sensor data may be shared by left sensor data module 218 and right sensor data module 220 (and, therefore, shared by all of the left and right processing channels).

Left outboard power control channel 202 and left outboard brake command channel 204 cooperate to influence the operation of left outboard brake mechanisms 222. In this regard, left outboard power control channel 202 and left outboard brake command channel 204 represent a control arrangement for the left outboard architecture of the electric brake system. For this example, left outboard power control channel 202 is suitably configured to provide the electric brake actuator operating power for left outboard brake mechanisms 222 using, e.g., a 130 volt power supply 224. Left outboard power control channel 202 functions to switch power supply 224 on and off as needed to enable and disable (respectively) left outboard brake mechanisms 222 (the switches shown in FIG. 2 are conceptual in nature and are shown for ease of description). In one embodiment, left outboard power control channel 202 is suitably configured to regulate operating power for an EBAC coupled to left outboard brake mechanisms 222.

Left outboard brake command channel 204 is in parallel with left outboard power control channel 202. Left outboard brake command channel 204 is suitably configured to process brake mechanism control signals for left outboard brake mechanisms 222. In one embodiment, left outboard brake command channel 204 is configured to generate brake mechanism control signals for execution by an EBAC coupled to left outboard brake mechanisms 222. Notably, the brake mechanism control signals are effective only when left outboard brake mechanisms 222 are provided with adequate operating power. Accordingly, left outboard brake mechanisms 222 will be actuated if left outboard power control channel 202 enables operating power while the brake mechanism control signal indicates the application of some clamping force. In contrast, left outboard brake mechanisms 222 will remain in a released (non-actuated) state if left outboard power control channel 202 disables operating power or if the brake mechanism control signal indicates the application of no clamping force.

In a preferred embodiment, the processing channels of the electric brake system are substantially (if not totally) independent of each other. For example, left outboard power control channel 202 is suitably configured to prevent actuation of left outboard brake mechanisms 222 independently of left outboard brake command channel 204. Likewise, left outboard brake command channel 204 is suitably configured to prevent actuation of left outboard brake mechanisms 222 independently of left outboard power control channel 202. Although these two processing channels may share some brake actuation data, sensors, and/or sensor interfaces, the processing intelligence that determines whether left outboard brake mechanisms 222 are actuated is separated. In addition, the control arrangements for the left outboard brake mechanisms 222, the left inboard brake mechanisms 226, the right inboard brake mechanisms 228, and the right outboard brake mechanisms 230 are substantially (if not totally) independent of each other. For example, the four control arrangements may operate concurrently with, and independent of, each other, or the left-side brake control architecture may operate concurrently with, and independent of, the right-side brake control architecture. The remaining three control arrangements depicted in FIG. 2 operate as described above for the left outboard processing channels.

FIG. 3 is a schematic representation of a portion of an aircraft electric brake system configured in accordance with an embodiment of the invention. In particular, FIG. 3 depicts components of a left electric brake subsystem architecture 300 (as mentioned above, the right electric brake subsystem architecture has a similar structure). The electric brake system may also be configured as described above in the context of FIG. 1 and FIG. 2. Accordingly, certain features, components, and functions of left electric brake subsystem architecture 300 will not be redundantly described here.

Left electric brake subsystem architecture 300 may include a BSCU 302, an outboard electric brake power supply unit (EBPSU) 304, an inboard EBPSU 306, an outboard EBAC 308, an inboard EBAC 310, one or more outboard brake mechanisms 312, and one or more inboard brake mechanisms 314. Subsystem architecture 300 is suitably configured to receive or process brake actuation data from brake pedal sensor(s) 316 and/or from other brake actuation sensor(s) 318.

BSCU 302 is generally configured as described above for BSCU 110. BSCU 302 may include a sensor data module 320, an outboard interlock decision module 322, an outboard brake command control 324, an inboard brake command control 326, and an inboard interlock decision module 328. Sensor data module 320 includes input nodes or ports for receiving the brake pedal sensor data and/or other brake actuation sensor data. Sensor data module 320 may also include one or more suitably configured sensor interfaces that facilitate communication with brake pedal sensor(s) 316 and other brake actuation sensor(s) 318. In this example, sensor data module 320 makes the same brake actuation data available to outboard interlock decision module 322, outboard brake command control 324, inboard brake command control 326, and inboard interlock decision module 328. The "output" of sensor data module 320 depicted in FIG. 3 may actually include a plurality of signals that indicate any number of different brake actuation data types.

Each interlock decision module 322/328 processes brake actuation data and generates, in response to the brake actuation data, a respective enable/disable control signal for a power supply (e.g., an EBPSU) of a brake mechanism. Here, outboard interlock decision module 322 generates one enable/disable control signal for outboard EBPSU 304, while inboard interlock decision module 328 generates another enable/disable control signal for inboard EBPSU 306. If, for example, the brake actuation data indicates a brake application condition, then each interlock decision module 322/328 will independently enable operating power to its respective brake mechanism(s). As used here, a "brake application condition" means any operating status, state, or configuration of the aircraft that is intended to result in the application of the brakes. For example, a brake application condition may result from: engagement of a brake pedal; setting of the parking brake lever; retraction of the landing gear (activation of gear retract braking); activation of an autobraking mode; or the like. On the other hand, if the brake actuation data does not indicate a brake application condition, then each interlock decision module 322/328 will independently disable operating power for its respective brake mechanism(s). This feature prevents inadvertent application of brakes, which might otherwise occur if an erroneous braking command is propagated through left electric brake subsystem architecture 300.

Each interlock decision module 322/328 may be realized in hardware using digital logic gates and related circuitry that processes the brake actuation data to generate the respective enable/disable control signals. In this regard, an enable/disable control signal may be a binary control signal having logic high and low states. The EBPSUs 304/306 respond to the respective enable/disable control signals in an appropriate manner.

Each brake command control 324/326 is suitably configured to generate respective brake mechanism control signals in response to the brake actuation data. Here, outboard brake command control 324 generates brake mechanism control signals for outboard EBAC 308, which in turn controls outboard brake mechanisms 312, while inboard brake command control 326 generates independent brake mechanism control signals for inboard EBAC 310, which in turn controls inboard brake mechanisms 314. In practice, the brake mechanism control signals influence the actuation of the electric brake actuators in the brake mechanisms (i.e., the percentage of full clamping force imparted by the electric brake actuators). For example, a brake mechanism control signal may command the electric brake actuators to release or apply no clamping force, it may command the electric brake actuators to apply full clamping force, or it may command the electric brake actuators to apply some intermediate clamping force.

Outboard interlock decision module 322 and outboard brake command control 324 operate concurrently (yet independently) on the same brake actuation data. Likewise, inboard interlock decision module 328 and inboard brake command control 326 operate concurrently (yet independently) on the same brake actuation data. The segregation of processing architectures in this manner improves reliability and robustness of the electric brake system.

In this embodiment, BSCU 302 controls EBPSUs 304/306 to enable/disable brake mechanisms 312/314 as needed. Each EBPSU 304/306 is configured to provide the operating voltage to its respective EBAC 308/310. As mentioned above in connection with FIG. 2, the nominal EBAC operating voltage for this embodiment is about 130 volts. Thus, the EBPSUs can enable/disable the brake mechanisms by providing/removing this 130 volt supply voltage to/from the EBACs.

Outboard EBAC 308 may employ an actuator power path 330 and an actuator control path 332. Actuator power path 330 represents structure, a channel, or an architecture configured to provide the operating power from outboard EBPSU to outboard brake mechanisms 312. Actuator control path 332 represents structure, a channel, or an architecture configured to process and transfer brake mechanism control signals from BSCU 302 to outboard brake mechanisms 312. Inboard EBAC 310 also includes similarly configured actuator command and actuator power paths. In this example, these four paths are separate and independent of each other.

Figure 4:
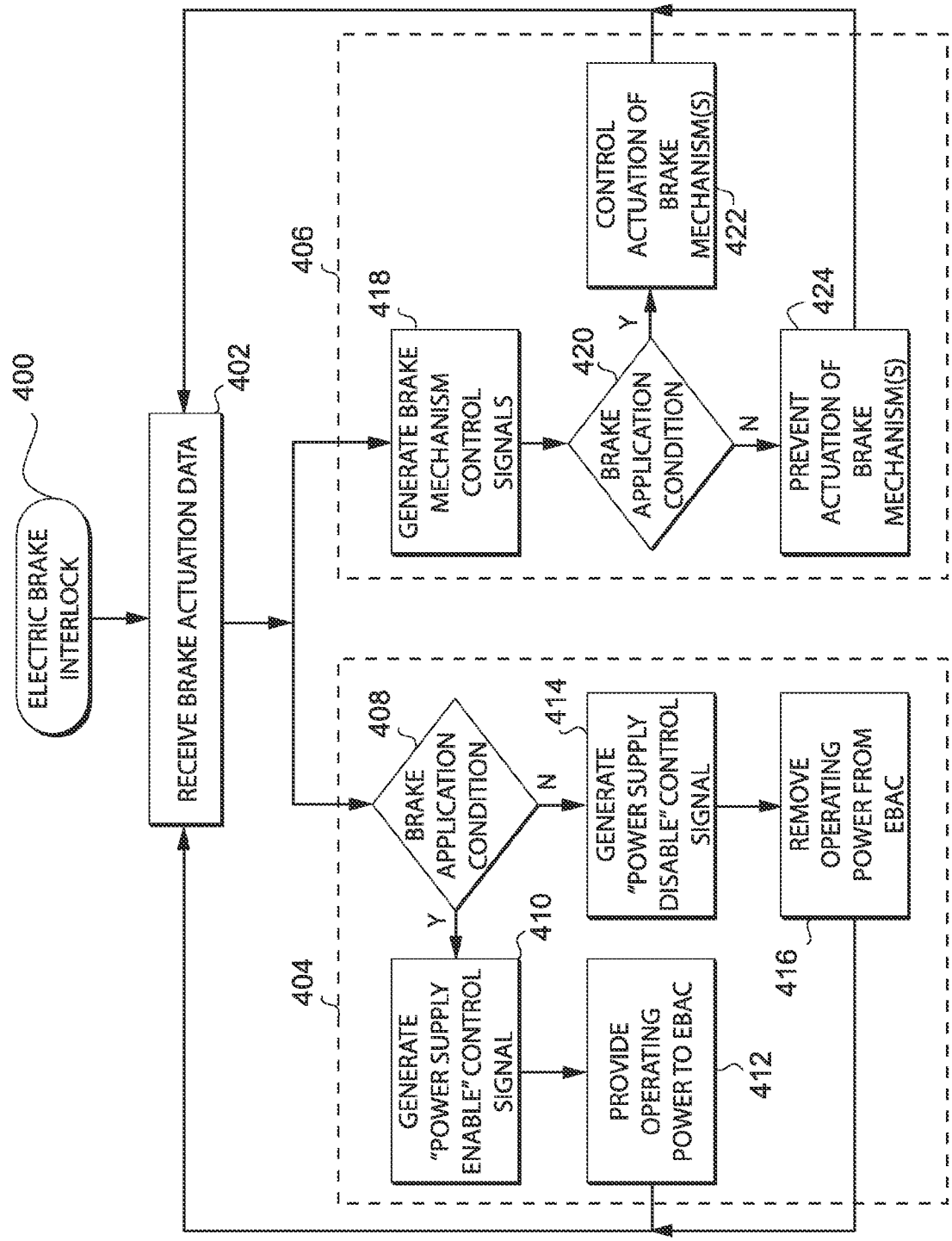
FIG. 4 is a flow chart that illustrates an interlock process for an aircraft electric brake system configured in accordance with an embodiment of the invention.

FIG. 4 is a flow chart that illustrates an electric brake interlock process 400 suitable for use in connection with an aircraft electric brake system. The various tasks performed in connection with process 400 may be performed by software, hardware, firmware, or any combination thereof. For illustrative purposes, the following description of process 400 may refer to elements mentioned above in connection with FIGS. 1-3. In embodiments of the invention, portions of process 400 may be performed by different elements of the described system, e.g., a BSCU, an EBAC, an EBPSU, or the like. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein.

In connection with electric brake interlock process 400, the electric brake system receives and processes brake actuation data (task 402) in a continuous or rapidly sampled manner. FIG. 4 depicts two processing branches that occur concurrently during process 400. An interlock processing branch 404 is shown on the left side of FIG. 4, and a brake command processing branch 406 is shown on the right side of FIG. 4. Interlock processing branch 404 analyzes the brake actuation data to determine whether it indicates a brake application condition (query task 408). If so, then process 400 generates a "power supply enable" control signal (task 410) that enables a power supply for the brake mechanisms. In addition, process 400 provides operating power to the brake mechanisms to enable the brake mechanisms (task 412). In other words, the brake mechanisms will be able to respond to brake mechanism control signals. In this example, process 400 controls an EBPSU to switch its operating power supply on such that the operating power is provided to the EBACs coupled to the EBPSU. In turn, the EBACs provide the operating power to the brake mechanisms.

If query task 408 does not indicate a brake application condition, then electric brake interlock process 400 will regulate the operating power for the brake mechanisms to temporarily disable the brake mechanisms. In this regard, process 400 generates a "power supply disable" control signal (task 414) that disables the power supply for the brake mechanisms (as a result, process 400 removes operating power from the brake mechanisms). In other words, the brake mechanisms will not be able to respond to any brake mechanism control signals because they lack sufficient operating power. In this example, process 400 controls an EBPSU to switch its operating power supply off to remove the operating power from the EBACs coupled to the EBPSU. In turn, the EBACs no longer provide operating power to the brake mechanisms.

Concurrently with (and independent of) interlock processing branch 404, brake command processing branch 406 generates brake mechanism control signals in response to the received brake actuation data (task 418). If the brake actuation data does not indicate a brake application condition (query task 420), then the brake mechanism control signals will be generated in an attempt to prevent actuation of the brake mechanisms (task 424). In other words, the brake mechanism control signals will command the brake mechanisms to release or apply no clamping force. If the brake actuation data indicates a brake application condition, then the brake mechanism control signals will be generated in an attempt to control actuation of the brake mechanisms (task 422). In other words, the brake mechanism control signals will command the brake mechanisms to actuate by a designated amount, resulting in some brake clamping force. As mentioned above, these brake commands will be ineffective if interlock processing branch 404 has removed operating power from the brake mechanisms.

In summary, an electric brake system as described herein utilizes a brake control architecture having a hardware-based interlock that provides an on/off control for the operating power of the brake mechanisms, and a software-based processing path that generates the brake commands for the brake mechanisms. With this approach, the probability of uncommanded brake application is the probability of both the hardware interlock failing and the software control failing, which is very low in practical deployments. The only components that are in common are the brake actuator motors and motor control (unlikely to command on their own) and the sensor interfaces and sensors. The sensor interfaces and sensors are duplicated for each pilot input or the inputs from other systems that cause the brakes to actuate, so that a single failure in a sensor or sensor circuit will not cause the brakes to actuate.

While at least one example embodiment has been presented in the foregoing detailed description, it should be appreciated that a vast number of variations exist. It should also be appreciated that the example embodiment or embodiments described herein are not intended to limit the scope, applicability, or configuration of subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A control arrangement for an electric brake system of an aircraft, the control arrangement comprising:
   a brake actuator power control architecture configured to enable/disable operating power for a brake mechanism of the electric brake system; and
   a brake actuator command architecture responsive to brake actuation data in parallel with the brake actuator power control architecture, the brake actuator command architecture being configured to process brake mechanism control signals for the brake mechanism;
   wherein the brake actuator power control architecture is capable of preventing actuation of the brake mechanism independently of the brake actuator command architecture including the presence or absence of a brake application condition; and
   the brake actuator command architecture is capable of preventing actuation of the brake mechanism independently of the brake actuator power control architecture.

2. A control arrangement according to claim 1, wherein the brake actuator power control architecture comprises an interlock decision module configured to process said brake actuation data and to generate, in response to the brake actuation data, an enable/disable control signal for a power supply of the brake mechanism.

3. A control arrangement according to claim 2, wherein the interlock decision module is configured to enable operating power for the brake mechanism when the brake actuation data indicates a brake application condition.

4. A control arrangement according to claim 1, wherein the brake actuator command architecture comprises a brake command control configured to generate the brake mechanism control signals in response to said brake actuation data.

5. A control architecture according to claim 4, wherein:
   the electric brake system comprises an electric brake actuator control coupled to the brake mechanism; and
   the brake command control is configured to generate the brake mechanism control signals for execution by the electric brake actuator control.

6. A control arrangement according to claim 1, wherein:
   the electric brake system comprises an electric brake actuator control coupled to the brake mechanism; and
   the brake actuator power control architecture is configured to regulate operating power for the electric brake actuator control.

7. A method for providing an interlock for an electric brake system of an aircraft, the electric brake system having a brake mechanism, the method comprising:
   (a) receiving brake actuation data;
   (b) processing the brake actuation data;
   (c) if the brake actuation data does not indicate a brake application condition, regulating operating power for the brake mechanism to temporarily disable the brake mechanism;
   concurrently with, and independent of, (b) and (c):
   (d) generating brake mechanism control signals in response to the brake actuation data; and
   (e) controlling actuation of the brake mechanism with the brake mechanism control signals;
   wherein the operating power is regulated independently of the presence or absence of a brake application condition.

8. A method according to claim 7, wherein the brake mechanism control signals prevent actuation of the brake mechanism when the brake actuation data does not indicate a brake application condition.

9. A method according to claim 7, further comprising:
   if the brake actuation data indicates a brake application condition, providing operating power to the brake mechanism to enable the brake mechanism.

10. A method according to claim 7, wherein:
    the electric brake system comprises an electric brake actuator control coupled to the brake mechanism; and
    regulating operating power for the brake mechanism comprises removing operating power from the electric brake actuator control.

11. An electric brake system for an aircraft, the electric brake system comprising:
    a first brake mechanism for a first wheel of the aircraft; and
    a first brake control architecture coupled to the first brake mechanism, the first brake control architecture comprising:
    a first brake command control configured to generate brake mechanism control signals for the first brake mechanism in response to brake actuation data; and
    a first interlock mechanism configured to regulate operating power for the first brake mechanism in response to the brake actuation data, concurrently with operation of the first brake command control, and independent of the first brake command control, said first interlock mechanism operable in the presence or absence of a brake application condition.

12. A system according to claim 11, wherein:
    the first interlock mechanism resides in a brake actuator power control architecture that is configured to enable/disable operating power for the first brake mechanism; and the first brake command control resides in a brake actuator command architecture that is in parallel with the brake actuator power control architecture, the brake actuator command architecture being configured to process the brake mechanism control signals for the first brake mechanism.

13. A system according to claim 12, wherein the brake actuator power control architecture comprises an interlock decision module configured to:
  process the brake actuation data; and
  generate, in response to the brake actuation data, an enable/disable control signal for a power supply of the first brake mechanism.

14. A system according to claim 13, wherein the interlock decision module is configured to enable operating power for the first brake mechanism when the brake actuation data indicates a brake application condition.

15. A system according to claim 13, wherein the interlock decision module is configured to disable operating power for the first brake mechanism when the brake actuation data does not indicate a brake application condition.

16. A system according to claim 12, wherein:
  the brake actuator power control architecture is capable of preventing actuation of the first brake mechanism independently of the brake actuator command architecture; and
  the brake actuator command architecture is capable of preventing actuation of the first brake mechanism independently of the brake actuator power control architecture.

17. A system according to claim 11, further comprising:
  a second brake mechanism for a second wheel of the aircraft; and
  a second brake control architecture coupled to the second brake mechanism, the second brake control architecture comprising:
  a second brake command control configured to generate brake mechanism control signals for the second brake mechanism in response to the brake actuation data; and
  a second interlock mechanism configured to regulate operating power for the second brake mechanism in response to the brake actuation data, concurrently with operation of the second brake command control, and independent of the second brake command control, in the presence or absence of a brake application condition.

18. A system according to claim 17, wherein the second brake control architecture operates concurrently with, and independent of, the first brake control architecture.

* * * * *